US012737410B2

(12) United States Patent
Adhikari et al.

(10) Patent No.: US 12,737,410 B2
(45) Date of Patent: Sep. 15, 2026

(54) BEHAVIORAL DRIVEN RETRIEVAL AUGMENTED GENERATION (RAG) SYSTEM

(71) Applicants: American Express Travel Related Services Company, Inc., New York, NY (US); American Express Services Europe Limited, London (GB)

(72) Inventors: Purushottam Adhikari, Worcester Park (GB); Yousef Simmons, Polegate (GB); Donna Tamara Peters, Pembroke Pines, FL (US)

(73) Assignees: American Express Travel Related Services Company, Inc., New York, NY (US); American Express Services Europe Limited, London (GB)

( * ) Notice: Subject to any disclaimer, the term of this patent is extended or adjusted under 35 U.S.C. 154(b) by 0 days.

(21) Appl. No.: 18/946,625

(22) Filed: Nov. 13, 2024

(65) Prior Publication Data

US 2026/0134026 A1 May 14, 2026

(51) Int. Cl.
*G06F 16/383* (2019.01)
*G06F 16/334* (2025.01)

(52) U.S. Cl.
CPC ........ *G06F 16/383* (2019.01); *G06F 16/3344* (2019.01); *G06F 16/3347* (2019.01)

(58) Field of Classification Search
CPC . G06F 16/383; G06F 16/3344; G06F 16/3347
USPC ........ 707/709, 722, 723, 734, 755, 781, 784
See application file for complete search history.

(56) References Cited

U.S. PATENT DOCUMENTS 11,126,647 B2 9/2021 Rollings et al.
2007/0198459 A1* 8/2007 Boone .................. G06F 16/951 707/E17.093
2019/0258963 A1* 8/2019 Guo .................. G06Q 10/1053
2023/0409614 A1* 12/2023 Hamilton ............ G06F 16/9024
2024/0020321 A1* 1/2024 Mosenia ........... G06F 16/24578
2024/0111794 A1* 4/2024 Osuala ................ G06F 16/3323
2024/0193212 A1* 6/2024 Casabuena Gonzalez .................. G06F 40/295
2025/0103640 A1* 3/2025 Dicklin ............... G06F 16/3334
2025/0103826 A1* 3/2025 Dicklin ............... G06F 16/9032

* cited by examiner

*Primary Examiner* — Md I Uddin
(74) *Attorney, Agent, or Firm* — STERNE, KESSLER, GOLDSTEIN & FOX P.L.L.C.

(57) ABSTRACT

Aspects disclosed provide systems and methods for implementing a behavioral driven retrieval augmentation generation (RAG) system. The system achieves this through the use an orchestration layer and a behavioral driven machine learning (ML) component that continuously learns what the best results are to user-generated queries and stores relevant documents, articles, texts, etc. associated with those queries.

17 Claims, 4 Drawing Sheets

100

BEHAVIORAL DRIVEN RETRIEVAL AUGMENTED GENERATION (RAG) SYSTEM

TECHNICAL FIELD

Aspects relate to natural language processing, and specifically to retrieval augmented generation (RAG) systems.

BACKGROUND

Generative artificial intelligence (AI) and large language models (LLMs) (e.g., Generative Pre-trained Transformers (GPTs)), hold enormous promise. This technology has already changed the way humans interact with computers because LLMs/GPTs can generate novel human-like content based on inputs and/or prompts that can mimic the creativity and ingenuity of humans.

To interface with LLMs/GPTs, interfaces such as chatbots have been developed. Chatbots allow inputs and/or queries to be given to LLMs/GPTs, so that LLMs/GPTs can generate answers based on the inputs/queries. For example, inputs/queries may be input into a chatbot via a text prompt. The text prompt may be augmented and sent to a LLM/GPT. The LLM/GPT can then generate answers and/or responses based on the text prompt. The answers/responses will attempt to answer the text prompt as correctly as possible to align with the context and intent of the prompt.

Unfortunately, the nature of LLMs/GPTs introduce unpredictability in LLM/GPT responses. This is because of two primary factors. The first is that the LLM/GPT may not have access to the correct databases or repositories from which to get the answers to the prompt. The second is that LLM/GPT training data is typically static, and there is a cut-off date on the knowledge it has. Therefore, answers that may have been correct at some point may no longer be correct, yet the LLM/GPT may not be aware of this.

Thus, systems and methods are needed to address these problems and to facilitate better and more accurate retrieval of information.

SUMMARY

Aspects disclosed herein provide a system and methods for improving the retrieval component of retrieval augmentation generation (RAG) systems for LLMs/GPTs. The system and methods improve conventional RAG systems by utilizing contextual understanding through machine learning (ML). This approach aims to decipher the nuanced meaning within the user queries and provide the recommended articles that have the most accurate answer by learning the historical behavior data from the users. The output from the ML models is used to re-rank a vector search result, and to provide the best document from which the answer to user queries can be found (i.e., if the search result retrieves the most relevant article in the 4th or 5th item in the search result, the ML component of the RAG system would re-rank and put the currently ranked 4th or 5th article at the top). This ensures the LLM/GPT gets the right documents, which has the answer and hence brings more contextually relevant documents to the RAG system. We call such a system a behavioral driven RAG system (abbreviated as BRAG systems or a BRAG system in this disclosure).

In aspects, the ML models may be trained on data that is captured based on the user feedback and input from subject matter experts (SMEs). The SMEs refer to individuals that have analyzed past queries and have evaluated whether the results returned have sufficiently answered the query.

In aspects, the ML models are tuned with a different hyperparameter to derive the best results. In addition, the ML models undergo further refinement, incorporating custom equations to bring further efficiency to the retrieval component.

In aspects, the system can perform its functions by implementing one or more computing devices to perform the aforementioned functionality. In aspects, the one or more computing devices can achieve the aforementioned functionality by receiving a user-generated query. Based on the user-generated query, a ranked list of documents may be retrieved and stored for later use. In aspects, to determine whether the retrieved documents are the best ones, the system can generate embeddings to categorize the user-generated query to obtain an embedded user-generated query. The embedded user-generated query can then be mapped to a vector space of a trained ML model. In aspects, K-nearest neighbors may be determined for the embedded user-generated query in the vector space. The K is an integer and represents the number of nearest neighbors to return. The K-nearest neighbors represent a K number of other queries within a Euclidean distance of the embedded user-generated query in the vector space.

In aspects, and for each of the K-nearest neighbors, a secondary list of documents may be identified. The secondary list of documents are documents that were retrieved based on each of the other queries represented by the K-nearest neighbors. In aspects, a count for each document in the secondary list of documents is determined. The count indicates a number of times each document was retrieved based on the other queries. In aspects, a custom equation including the count may be applied to each document in the secondary list of documents to determine a score for each document. The score will represent a relevancy of each document to the user-generated query.

In aspects, once the score is determined for each of the documents in the secondary list of documents, a re-ranking is performed. The re-ranking will re-rank the ranked list of documents based on each score to obtain a re-ranked list of documents. Once the re-ranked documents are obtained, they are transmitted to a LLM/GPT to generate an answer to the user-generated query based on the re-ranked list of documents.

In aspects, the mapped embedded user-generated query may be stored in the vector space to be used when identifying K-nearest neighbors for future queries. In this way, the ML model may be constantly trained based on historic queries. In aspects, prior to storing the mapped embedded user-generated query to the vector space, a SME may give feedback as to the results obtained from performing the aforementioned functions. If the SME determines that the results yield correct or acceptable results, the SME can indicate as much, and the mapped embedded user-generated query may be stored in the vector space along with the re-ranked list of documents associated with it. This forms the basis of how the system utilizes past behavior to inform what results the ML model retrieves when identifying the secondary list of documents.

Certain aspects have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art (POSA) to make and use the aspects.

DETAILED DESCRIPTION

Figure 1:
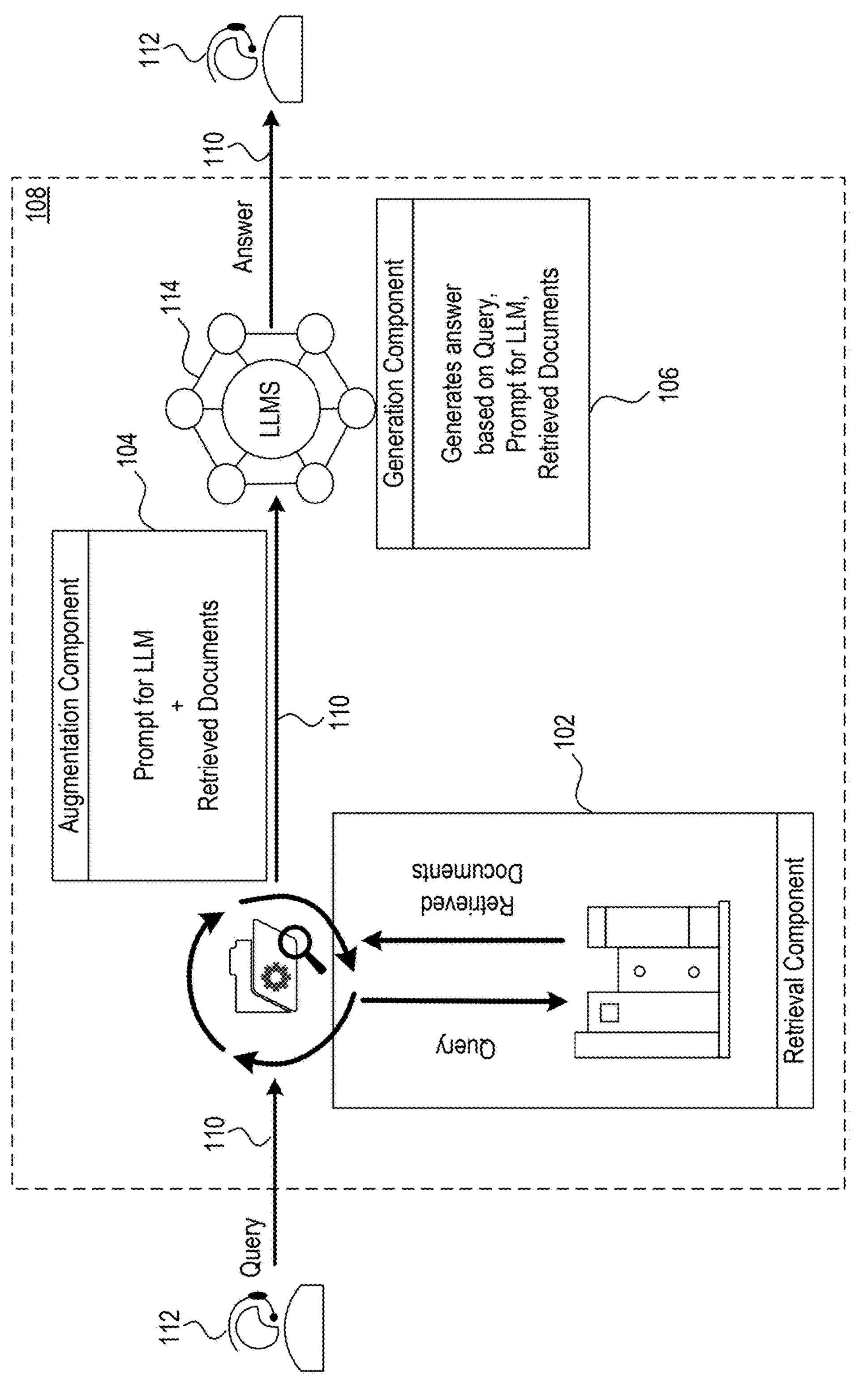
FIG. 1 is an example of a conventional RAG system.

Aspects disclosed herein provide a system and methods for improving the retrieval component of RAG systems.

The efficacy of RAG systems hinge crucially on the retrieval component. If the retrieval process fails to obtain accurate and relevant information from external knowledge bases, the RAG system faces a fundamental setback. Thus, the system's ability to provide a correct answer, especially in response to domain specific or highly specialized queries is contingent upon the quality of retrieved information.

The retrieval component may be affected in the following manner, as indicated by the examples that follow. First assume that the RAG system is used in the context of a call center, with customer-care representatives from a company answering calls from clients or customers regarding various issues. In the context of a bank's call center, this may be questions regarding what are the highest yielding interest bearing accounts? what the benefits of various credit cards are? etc. The customer-care representatives can use a chatbot to query an LLM/GPT to try to obtain an answer to the question. One challenge is that customer-care representatives across different markets and business units may employ varied terms for identical business processes introducing contextual ambiguity in queries. Furthermore, individual customer-care representatives, based on their tenure and experience, may articulate queries differently for the same process related question. The query from tenured customer-care representatives may be different from customer-care representatives who are less tenured. This variation in queries may yield different search results in the retrieval component impacting the overall accuracy of answers from the RAG system The retrieval component may also be affected by contextual misalignment in top results retrieved. As LLMs/GPTs work on a limited number of tokens, a retrieval component may get a top-1 or top-3 articles from a database based on the semantic meaning of the question. The top-1 or top-3 results may lack the necessary contextual meaning, and the crucial article to answer the query may reside in the 4th or 5th article in the search result. By limiting the RAG system with a top few search result set, a user might receive a suboptimal answer as the top few articles in the search result may not capture the nuanced meaning of the queries.

The system and methods improve conventional RAG systems by adding further optimization components to compliment the retrieval component of conventional RAG systems. This optimization is achieved through the use of a trained ML model and the use of custom equations (also referred to as fine tuning equations herein) to the output of the trained ML model to obtain a targeted list of documents that are determined to be responsive to a query. Based on a relevancy score determined, the documents may be used to re-rank an initial set of documents obtained by the RAG system for the query. To continuously train the ML model, SMEs can provide feedback as to whether the re-ranked list is responsive to the query. If so, the query and the results are saved into the vector space to be used for future queries and document retrieval.

The following aspects are described in sufficient detail to enable a POSA to make and use the disclosure. It is to be understood that other aspects are evident based on the present disclosure, and that system, process, or mechanical changes may be made without departing from the scope of aspects of the present disclosure.

In the following description, numerous specific details are given to provide a thorough understanding of the disclosure. However, it will be apparent that the disclosure may be practiced without these specific details. In order to avoid obscuring an aspect of the present disclosure, some well-known circuits, system configurations, architectures, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an aspect of the present disclosure in accordance with the context in which the term is used. For example, the software may be machine code, firmware, embedded code, or application software. Also, for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

System Overview and Function

FIG. 1 is an example conventional RAG system 100. RAG systems are known in the art. In the example shown in FIG. 1, and as in all RAG systems, RAG system 100 is made up of three fundamental components. These components are a retrieval component 102, an augmentation component 104, and a generation component 106. In aspects, these components may be implemented on backend computing infrastructure, including a server infrastructure, of a company, institution, or similar organization.

In aspects, the backend computing infrastructure may be housed in a cloud computing environment 108. The cloud computing environment 108 can include a server infrastructure. The cloud computing environment 108 may be a public or private cloud service. Examples of a public cloud include, without limitation, Amazon Web Services (AWS), IBM Cloud, Oracle Cloud Solutions, Microsoft Azure Cloud, and Google Cloud. A private cloud refers to a cloud environment similar to a public cloud with the exception that it is operated solely for a single organization. Alternatively, the backend computing infrastructure may not be a cloud computing environment 108 but server infrastructure housed in the company, institution, or similar organization's warehouse, data center, or other physical location.

In aspects, the cloud computing environment 108 can comprise a variety of centralized or decentralized computing devices. For example, the cloud computing environment 108 may include a mobile device, a laptop computer, a desktop computer, grid-computing resources, a virtualized computing resource, cloud computing resources, peer-to-peer distributed computing devices, a server, a server farm, or a combination thereof. The cloud computing environment 108 may be centralized in a single room, distributed across different rooms, distributed across different geographic locations, or embedded within a network 110.

The network 110 can connect the backend computing infrastructure to various external users and/or devices. For example, assuming the RAG system 100 is used in the context of a customer call center, the network 110 can connect a customer care representative device 112 to the RAG system 100. The customer care representative device 112 can query the RAG system 100 via the network 110 to get answers to customer calls and inquiries. The aforementioned use case is exemplary. It will be used throughout this disclosure to illustrate novel features of the disclosure. The RAG system 100, however, may be used in other contexts, as will be recognized by a POSA reading this disclosure.

The network 110 refers to a telecommunications network, such as a wired or wireless network. The network 110 can span and represent a variety of networks and network topologies. For example, the network 110 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 can traverse a number of topologies and distances. For example, the network 110 can include a direct connection, personal area network (PAN), local area network (LAN), metropolitan area network (MAN), wide area network (WAN), or a combination thereof.

While the operation of conventional RAG systems (e.g., RAG system 100), are known and will not be described in detail, an overview of the functions will be given for background to those reading this disclosure that are not familiar with RAG systems. The description will be given in the context of a customer call center as previously mentioned.

In FIG. 1, RAG system 100 can operate by receiving a user-generated query from a customer care representative device 112. The user-generated query may be a question that the customer care representative device 112 poses to RAG system 100 based on a question from a customer. Once received, the user-generated query and/or its embeddings may be transmitted to the retrieval component 102. The retrieval component 102 can then query a database or repository for documents, articles, texts, etc. or references thereto, that are believed to be responsive to the user-generated query. The documents, articles, texts, etc. may be ranked in a given order pertaining to the relevance the RAG system 100 believes each document has to the user-generated query. Once identified, these documents, articles, texts, etc. may be sent back to the augmentation component 104 to be combined with a prompt for a LLM/GPT 114 of the generation component 106. This prompt and the retrieved documents can then be transmitted to the generation component 106, so that the LLM/GPT 114 of the generation component 106 can generate a response/answer based on the prompt and retrieved documents. That response/answer is then given back to the customer care representative device 112 in response to the user-generated query.

Figure 2:
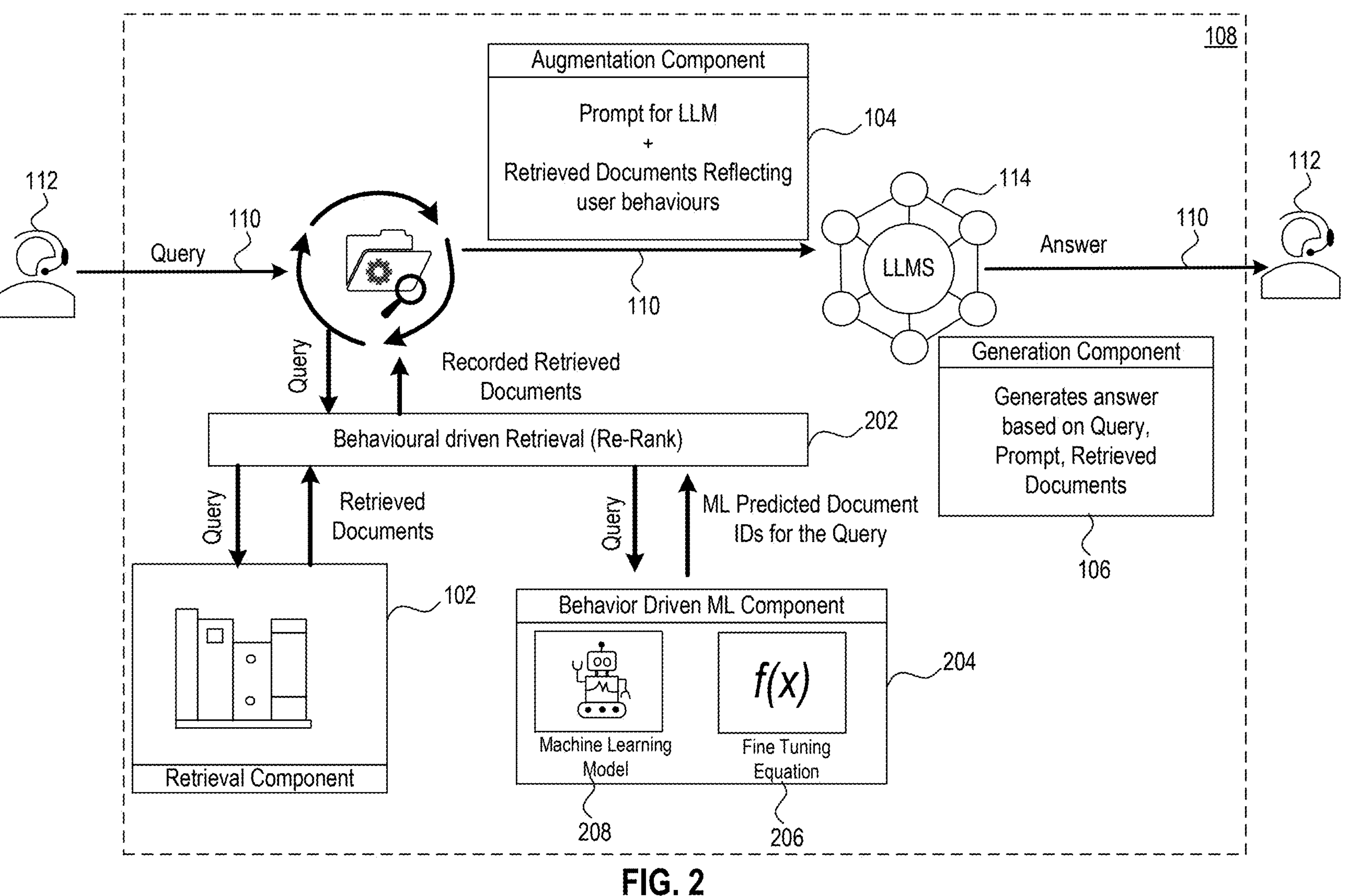
FIG. 2 is an example of a behavioral driven RAG (BRAG) system according to aspects.

FIG. 2 is an example of a behavioral driven RAG (BRAG) system 200 according to aspects. BRAG system 200 represents the improvements over RAG system 100. As shown by FIG. 2, two additional components are added to RAG system 100, in order to form BRAG system 200. These are an orchestration layer 202 and a behavioral driven ML component 204. Both will be described in detail below.

In aspects, the BRAG system 200 may begin its operation in the same way as RAG system 100. That is, the BRAG system 200 can receive a user-generated query from, for example, the customer care representative device 112 of FIG. 1. Based on the user-generated query, the BRAG system 200 can transmit the user-generated query to the orchestration layer 202. The orchestration layer 202 refers to a software and/or hardware component of the BRAG system 200 that may be used to coordinate the functions of the retrieval component 102, the behavioral driven ML component 204, and the augmentation component 104 (as described with respect to FIG. 1) of the BRAG system 200. In aspect, the orchestration layer 202 can receive the user-generated query and add embeddings to the user-generated query. Embeddings refer to labels or tags that are appended to the user-generated query, and that can identify relevant information from the query. For example, and taking an example user-generated query that asks "what are the benefits of a platinum card?", is known to have originated from a call center in the United States and is also known to have originated from a customer care representative device 112 in a particular department of a company, the embeddings can indicate character strings indicating the known information. For example, the embeddings can modify the user-generated query to read as "US [September] particular department [September] what are the benefits of a platinum card." Thus, the embeddings can categorize the user-generated query. This categorization may be used to better target the user-generated query such that more relevant documents, articles, and text may be retrieved in response to the same. In aspects, the embeddings may be generated by, for example, Sentence Transformers using MSMARCO Models.

In aspects, the orchestration layer 202 can pass the embedded user-generated query to a retrieval component (e.g., retrieval component 102 of FIG. 1). The retrieval component 102 can then retrieve documents, articles, texts, etc. believed to be relevant to the embedded user-generated query, similar to what was described with respect to FIG. 1. In aspects, the retrieved documents may be ordered in a ranked format, thus forming a ranked list of documents. The ranked list of documents represent the ordering in which the retrieval component 102 believes the retrieved each document, article, text, etc. is relevant to the embedded user-generated query. For example, the highest ranked document may be the most relevant while the lowest ranked document may be the least relevant. In aspects, the ranked list of documents and/or a reference to the ranked list of documents may be transmitted back to the orchestration layer 202 to be stored for later use and comparison with the output of the behavioral driven ML component 204.

In aspects, the BRAG system 200 can also transmit the embedded user-generated query to the behavioral driven ML component 204. The behavioral driven ML component 204 refers to a software and/or hardware component of the BRAG system 200 that comprises both a trained ML model 208 and a custom equation (e.g., fine tuning equation 206) that can further refine the universe of document, articles, texts, etc. believed to be relevant to the embedded user-generated query.

In aspects, the embedded user-generated query may be first transmitted to the trained ML model 208. The trained ML model 208 can map the embedded user-generated query to a vector space. A POSA reading this disclosure will understand how the trained ML model 208 can map the embedded user-generated query to the vector space, by tokenizing the embedded user-generated query and obtaining values representing coordinates in the vector space to which the embedded user-generated query is mapped to.

In aspects, using the mapping, the behavioral driven ML component 204 can perform a nearest neighbor search for the embedded user-generated query in the vector space. In aspects, this may be done by implementing a K-Nearest Neighbor (KNN) algorithm, utilizing a nearest neighbors module. For example, this may be the NearestNeighbors module from the "sklearn.neighbors" package of the Python programming language. The KNN algorithm can process embedded user-generated query to establish a neighborhood of nearest data points for the embedded user-generated query in the vector space. The KNN algorithm can facilitate the efficient identification of the K-nearest neighbors of the embedded user-generated query based on the proximity of the embeddings of the embedded user-generated query to other embeddings of other queries that the trained ML model 208 was trained on. The reference to "K" is that K represents a number of other queries within a Euclidean distance of the embedded user-generated query in the vector space. In aspects, K is an integer. In aspects, it has been discovered that K having a value in the range of 15-25 provides the most optimal results. Thus, the KNN algorithm will return the 15-25 closes result to the embedded user-generated query in the vector space.

In aspects, each of the K-nearest neighbors identified may be represented as a data object that have references to documents, articles, texts, etc. associated with each of the K-nearest neighbors. These associated documents, articles, texts, etc. will be referred to as a secondary list of documents, different from the ranked list of documents returned by the retrieval component 102. The secondary list of documents are the documents, articles, texts, etc. that were retrieved based on each of the other queries represented by the K-nearest neighbors. In aspects, this secondary list of documents can inform the behavioral driven ML component 204 of the universe of documents previously returned based on similar queries with similar embeddings as the embedded user-generated query. The secondary list of documents may be used to determine which documents from the ranked list of documents is likely to be the most relevant to providing an answer to the embedded user-generated query.

In aspects, how the behavioral driven ML component 204 determines the relevancy of the secondary list of documents is to perform a count of the number of times each document in the secondary list of documents was cited in response to each of the other queries. The count may be stored as a variable that may be used when applying the fine tuning equation 206 to each of the secondary list of documents to obtain a score for each document, where the score represents a relevancy of each document to the embedded user-generated query.

In aspects, and assuming that a count is obtained for each of the documents, articles, texts, etc. of the secondary list of documents, the behavioral driven ML component 204 can then apply the fine tuning equation 206 to obtain a score for each document. In aspects, the fine tuning equation 206 may be equation (1), shown below:

$$\text{SCORE}=(((1/(\text{distance}-(\text{min\_distance}+1)))*WD\,(\text{count}/\text{mean\_count})*WC)/(WD+WC))*100 \tag{1}$$

In equation (1), SCORE is a value of the score, distance is a Euclidean distance of a K-nearest neighbor of the K-nearest neighbors to the mapped embedded user-generated query, min_distance is a minimum distance a Euclidean distance between the embedded user-generated query in the vector space and the closest data point in the vector space as determined by the nearest neighbor search, WD is a distance coefficient, count is the number of times a document in the secondary list of documents was retrieved for other queries, mean_count is the sum of all counts of all the documents in the secondary list of documents divided by the number of documents in the secondary list of documents, and WC is a count coefficient. In aspects it has been determined that WD in the range of 1.0 to 2.0 and WC in the range of 0.5 to 1.0 provides the most optimal results. Equation (1) acts as a fine-tuning mechanism, ensuring that the final relevancy score is not only relevant based on the KNN algorithm but also optimized to meet the precise parameters and context of the embedded user-generated query more closely. This is by using the coefficients to give greater weights to distances and counts of documents, articles, texts, etc. to the embedded user-generated query.

In aspects, once the score is determined for each of the secondary list of documents, the secondary list of documents along with their scores may be transmitted back to the orchestration layer 202 for further processing. In aspects, the orchestration layer 202 can perform a re-ranking of the ranked list of documents based on each score obtained from applying the fine tuning equation, to obtain a re-ranked list of documents. In aspects, the re-ranked list of documents may be obtained by determining which documents from the secondary list of documents were also documents that appeared as a part of the ranked list of documents and ranking the ones with the highest counts as the higher ranking documents, articles, text, etc. In this way, past queries and documents returned with respect to the past queries may be factored into what documents, articles, texts, etc. are relevant to the embedded user-generated query. In aspects, if there is a prevalence of references to documents, articles, texts, etc. not found in the ranked list of documents but found in the secondary list of documents, the re-ranking can take into account the prevalence of the references to documents, articles, texts, etc. not found in the ranked list of documents and modify the ranked list of documents to include those based on their score.

In aspects, once the re-ranked list of documents is obtained, the re-ranked list of documents along with the user-generated query may be transmitted to the augmentation component 104 and the generation component 106 to generate an answer/response to the user-generated query based on the re-ranked list. In aspects, the re-ranked list and the embedded user-generated query may be stored to the vector space to be used when identifying K-nearest neighbors for future queries. The storage can depend on SME feedback indicating whether the re-ranked list of documents was relevant to the user-generated query. If determined to be relevant, the re-ranked list of documents and the embedded user-generated query may be mapped to the vector space to be used in further searches. As such, the behavioral driven ML component 204 in general and the ML model 208 specifically can continuously be trained and updated with the most up to date relevant information to user-generated queries.

The BRAG system 200 described presents a unique solution within conventional RAG system frameworks. The BRAG system 200 leverages ML models trained on user behavior data, including feedback and business-validated data, to enhance the retrieval process. The innovation lies in the dynamic adaptability of the ML model 208 to changes in user behavior and new documents, articles, texts, etc., ensuring that the BRAG system 200 remains responsive and aligned with evolving preferences and patterns. By continuously learning from user interactions, the component refines its understanding of relevance, enabling it to surface the most appropriate content for each individual query and hence producing the most accurate answer for the user. The uniqueness of this solution manifests in the re-ranking logic applied to the vector search results using the above described ML model 208. The predictions generated by the ML model 208 and fine tuning equation 206 are used to re-order the initial search results, promoting the documents, articles, texts, etc. most likely to contain the desired information to the top of the ranking. This re-ranking process is a key differentiator, as it optimizes the retrieval step by surfacing the most relevant content first, thereby increasing the efficiency and accuracy of the overall BRAG system 200.

The functions of the BRAG system 200 may be performed by the modules or units of the backend computing devices of the BRAG system 200, for example computing devices similar to those of the cloud computing environment 108 of FIG. 1. The modules or units may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the BRAG system 200, or installed as a removable portion of the BRAG system 200.

Methods of Operation

Figure 3:
FIG. 3 is an example method of operation of the BRAG system according to aspects.

FIG. 3 is an example method 300 of operating the BRAG system 200 according to aspects. Method 300 may be implemented on computing devices, for example the computing devices of the cloud computing environment 108.

In aspects, method 300 may begin by receiving, by one or more computing devices, a user-generated query, as shown in box 302.

In aspects, based on the user-generated query, the BRAG system 200, via a retrieval component 102, can retrieve a ranked list of documents based on the user-generated query, as shown in box 304.

In aspects, the user-generated query can also be tagged with embeddings. For example, in aspects, the BRAG system 200, via the orchestration layer 202, can generate embeddings to categorize the user-generated query to obtain an embedded user-generated query, as shown in box 306.

In aspects, the embedded user-generated query passed to an ML model 208, and can be mapped to a vector space, as shown in box 308.

In aspects, K-nearest neighbors for the embedded user-generated query in the vector space can be determined, as shown in box 310.

In aspects, K is an integer and the K-nearest neighbors represent a K number of other queries within a Euclidean distance of the embedded user-generated query in the vector space. In aspects, for each of the K-nearest neighbors, a secondary list of documents can be identified, as shown in box 312.

The secondary list of documents are documents that were retrieved based on each of the other queries represented by the K-nearest neighbors. In aspects, a count for each document in the secondary list of documents can be determined, as shown in box 314.

The count indicates a number of times each document was retrieved based on the other queries. In aspects, a customer equation (e.g., fine tuning equation 206) including the count can be applied to each document in the secondary list of documents to determine a score for each document, as shown in box 316.

The score represents a relevancy of each document to the user-generated query. In aspects, a re-ranking of the ranked list of documents can be performed, as shown by box 318.

In aspects, the re-ranking can be based on each score obtained from applying the custom equation, to obtain a re-ranked list of documents.

In aspects, once the re-ranked list of documents is obtained, the re-ranked list can be transmitted to a LLM to generate an answer to the user-generated query based on the re-ranked list of documents, as shown in box 320.

The operation of method 300 is performed, for example, by BRAG system 200, in accordance with aspects described above.

Components of the System

Figure 4:
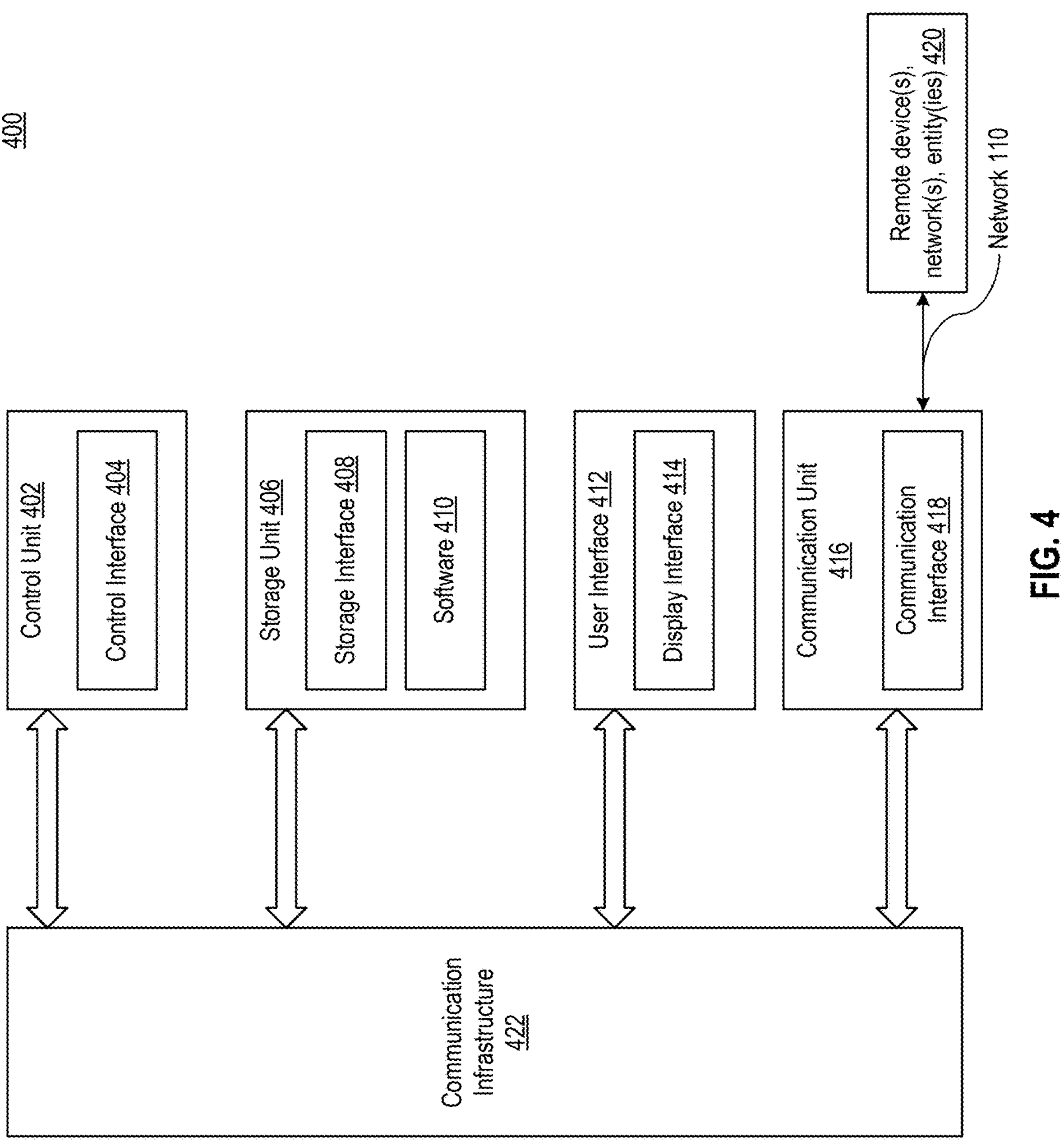
FIG. 4 is an example architecture of the components that may be used to implement the one or more computing devices of the system according to aspects.

FIG. 4 is an example architecture 400 of the components implementing the BRAG system 200 according to aspects. The components may be implemented on any of the devices of the BRAG system 200, for example the computing devices of the cloud computing environment 108. In aspects, the components may include a control unit 402, a storage unit 406, a communication unit 416, and a user interface 412. The control unit 402 may include a control interface 404. The control unit 402 may execute software 410 to provide some or all of the intelligence of BRAG system 200. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 may be used for communication between the control unit 402 and other functional units or devices of BRAG system 200. The control interface 404 may also be used for communication that is external to the functional units or devices of BRAG system 200. The control interface 404 may receive information from the functional units or devices of BRAG system 200, or from remote devices 420, or may transmit information to the functional units or devices of system 100, or to remote devices 420. The remote devices 420 refer to devices external to BRAG system 200.

The control interface 404 may be implemented in different ways and may include different implementations depending on which functional units or devices of BRAG system 200 or remote devices 420 are being interfaced with the control unit 402. For example, the control interface 404 may be implemented with integrated circuits, optical circuitry, waveguides, wireless circuitry, wireline circuitry to attach to a bus, an application programming interface (API), or a combination thereof. The control interface 404 may be connected to a communication infrastructure 422, such as a bus, to interface with the functional units or devices of BRAG system 200 or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a nonvolatile storage such as nonvolatile random access memory (NVRAM), Flash memory, disk storage, or a volatile storage such as static random access memory (SRAM) or dynamic random access memory (DRAM).

The storage unit 406 may include a storage interface 408. The storage interface 408 may be used for communication between the storage unit 406 and other functional units or devices of BRAG system 200. The storage interface 408 may also be used for communication that is external to BRAG system 200. The storage interface 408 may receive information from the other functional units or devices of BRAG system 200 or from remote devices 420, or may transmit information to the other functional units or devices of BRAG system 200 or to remote devices 420. The storage interface 408 may include different implementations depending on which functional units or devices of BRAG system 200 or remote devices 420 are being interfaced with the storage unit 406. The storage interface 408 may be implemented with technologies and techniques similar to the implementation of the control interface 404.

The communication unit 416 may enable communication to devices, components, modules, or units of BRAG system 200 or to remote devices 420. For example, the communication unit 416 may permit the BRAG system 200 to communicate between the customer-care representative 112 and the BRAG system 200 components in the cloud computing environment 108. The communication unit 416 may further permit the devices of BRAG system 200 to communicate with remote devices 420 such as an attachment, a peripheral device, or a combination thereof through the network 110.

As previously indicated, the network 110 may span and represent a variety of networks and network topologies. For example, the network 110 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 may traverse a number of network topologies and distances. For example, the network 110 may include direct connection, personal area network (PAN), local area network (LAN), metropolitan area network (MAN), wide area network (WAN), or a combination thereof.

The communication unit 416 may also function as a communication hub allowing BRAG system 200 to function as part of the network 110 and not be limited to be an end point or terminal unit to the network 110. The communication unit 416 may include active and passive components, such as microelectronics, wireless circuitry, wireline circuitry, radio frequency circuitry, and/or an antenna, for interaction with the network 110.

The communication unit 416 may include a communication interface 418. The communication interface 418 may be used for communication between the communication unit 416 and other functional units or devices of BRAG system 200 or to remote devices 420. The communication interface 418 may receive information from the other functional units or devices of BRAG system 200, or from remote devices 420, or may transmit information to the other functional units or devices of the BRAG system 200 or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by BRAG system 200. In many aspects, the user interface 412 allows a user to interface with the devices of BRAG system 200 or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display interface 414. The control unit 402 may operate the user interface 412 to present information generated by BRAG system 200. The control unit 402 may also execute the software 410 to present information generated by system 100, or to control other functional units of BRAG system 200. The display interface 414 may be any graphical user interface such as a display, a projector, a video screen, or any combination thereof.

The above detailed description and aspects of the disclosed BRAG system 200 are not intended to be exhaustive or to limit the disclosed BRAG system 200 to the precise form disclosed above. While specific examples for BRAG system 200 are described above for illustrative purposes, various equivalent modifications are possible within the scope of the disclosed BRAG system 200, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods and systems are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the aspects of the present disclosure consequently further the state of the technology to at least the next level. While the disclosed aspects have been described as the best mode of implementing BRAG system 200, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the disclosure should be determined not by the aspects illustrated, but by the appended claims and their equivalents.

What is claimed is:

1. A computer-implemented method comprising:

receiving, by one or more computing devices, a user-generated query;

retrieving, by the one or more computing devices, a ranked list of documents based on the user-generated query;

generating, by the one or more computing devices, embeddings to categorize the user-generated query to obtain an embedded user-generated query;

mapping, by the one or more computing devices, the embedded user-generated query to a vector space;

determining, by the one or more computing devices, K-nearest neighbors for the embedded user-generated query in the vector space, wherein K is an integer and the K-nearest neighbors represent a K number of other queries within a Euclidean distance of the embedded user-generated query in the vector space;

identifying, by the one or more computing devices and for each of the K-nearest neighbors, a secondary list of documents, wherein the secondary list of documents are documents that were retrieved based on each of the other queries represented by the K-nearest neighbors;

determining, by the one or more computing devices, a count for each document in the secondary list of documents, wherein the count indicates a number of times each document in the secondary list of documents was retrieved based on the other queries;

applying, by the one or more computing devices, a custom equation including the count to each document in the secondary list of documents to determine a score for each document in the secondary list of documents, wherein the score represents a relevancy of each document in the secondary list of documents to the user-generated query;

re-ranking, by the one or more computing devices, the ranked list of documents based on each score obtained from applying the custom equation, to obtain a re-ranked list of documents;

transmitting, by the one or more computing devices, the re-ranked list to a large language model to generate an answer to the user-generated query based on the re-ranked list of documents; and storing, by the one or more computing devices, the mapped embedded user-generated query in the vector space to be used when identifying the K-nearest neighbors for future queries.

2. The computer-implemented method of claim 1, wherein the custom equation is:

$$\mathrm{SCORE}=(((1/(\mathrm{distance}-(\mathrm{min\_distance}+1)))*WD+(\mathrm{count}/\mathrm{mean\_count})*WC)/(WD+WC))*100,$$

wherein,

SCORE is a value of the score, distance is a Euclidean distance of a K-nearest neighbor of the K-nearest neighbors to the mapped embedded user-generated query, min_distance is a minimum distance a Euclidean distance between the embedded user-generated query in the vector space and a closest data point in the vector space as determined by a nearest neighbor search, WD is a distance coefficient, count is the count, mean_count is a sum of all counts of all documents in the secondary list of documents divided by a sum of documents in the secondary list of documents, and WC is a count coefficient.

3. The computer-implemented method of claim 2, wherein WD is in a range of 1.0 to 2.0.

4. The computer-implemented method of claim 2, wherein WC is in a range of 0.5 to 1.0.

5. The computer-implemented method of claim 1, wherein the embeddings are generated with sentence transformers.

6. The computer-implemented method of claim 1, wherein K is in a range of 15-25.

7. A non-transitory computer readable medium storing instructions, that when executed by one or more processors of a computing system, cause the one or more processors to perform operations comprising:

receiving a user-generated query;

retrieving a ranked list of documents based on the user-generated query;

generating embeddings to categorize the user-generated query to obtain an embedded user-generated query;

mapping the embedded user-generated query to a vector space;

determining K-nearest neighbors for the embedded user-generated query in the vector space, wherein K is an integer and the K-nearest neighbors represent a K number of other queries within a Euclidean distance of the embedded user-generated query in the vector space;

identifying, for each of the K-nearest neighbors, a secondary list of documents, wherein the secondary list of documents are documents that were retrieved based on each of the other queries represented by the K-nearest neighbors;

determining a count for each document in the secondary list of documents, wherein the count indicates a number of times each document in the secondary list of documents was retrieved based on the other queries;

applying a custom equation including the count to each document in the secondary list of documents to determine a score for each document in the secondary list of documents, wherein the score represents a relevancy of each document in the secondary list of documents to the user-generated query;

re-ranking the ranked list of documents based on each score obtained from applying the custom equation, to obtain a re-ranked list of documents;

transmitting the re-ranked list to a large language model to generate an answer to the user-generated query based on the re-ranked list of documents; and storing the mapped embedded user-generated query in the vector space to be used when identifying the K-nearest neighbors for future queries.

8. The non-transitory computer readable medium of claim 7, wherein the custom equation is:

SCORE=(((1/(distance−(min_distance+1)))*WD+(count/mean_count)*WC)/(WD+WC))*100,
wherein, SCORE is a value of the score, distance is a Euclidean distance of a K-nearest neighbor of the K-nearest neighbors to the mapped embedded user-generated query, min_distance is a minimum distance a Euclidean distance between the embedded user-generated query in the vector space and a closest data point in the vector space as determined by a nearest neighbor search, WD is a distance coefficient, count is the count, mean_count is a sum of all counts of all documents in the secondary list of documents divided by a sum of documents in the secondary list of documents, and WC is a count coefficient.

9. The non-transitory computer readable medium of claim 8, wherein WD is in a range of 1.0 to 2.0.

10. The non-transitory computer readable medium of claim 8, wherein WC is in a range of 0.5 to 1.0.

11. The non-transitory computer readable medium of claim 7, wherein the embeddings are generated with sentence transformers.

12. The non-transitory computer readable medium of claim 7, wherein K is in a range of 15-25.

13. A computing system comprising:

one or more memories storing instructions; and one or more processors, coupled to the one or more memories, configured to process the stored instructions to:

receive a user-generated query;

retrieve a ranked list of documents based on the user-generated query;

generate embeddings to categorize the user-generated query to obtain an embedded user-generated query;

map the embedded user-generated query to a vector space;

determine K-nearest neighbors for the embedded user-generated query in the vector space, wherein K is an integer and the K-nearest neighbors represent a K number of other queries within a Euclidean distance of the embedded user-generated query in the vector space;

identify, for each of the K-nearest neighbors, a secondary list of documents, wherein the secondary list of documents are documents that were retrieved based on each of the other queries represented by the K-nearest neighbors;

determine a count for each document in the secondary list of documents, wherein the count indicates a number of times each document in the secondary list of documents was retrieved based on the other queries;

apply a custom equation including the count to each document in the secondary list of documents to determine a score for each document in the secondary list of documents, wherein the score represents a relevancy of each document in the secondary list of documents to the user-generated query;

re-rank the ranked list of documents based on each score obtained from applying the custom equation, to obtain a re-ranked list of documents;

transmit the re-ranked list to a large language model to generate an answer to the user-generated query based on the re-ranked list of documents; and store the mapped embedded user-generated query in the vector space to be used when identifying the K-nearest neighbors for future queries.

14. The computing system of claim 13, wherein the custom equation is:

SCORE=(((1/(distance−(min_distance+1)))*WD+(count/mean_count)*WC)/(WD+WC))*100,
wherein, SCORE is a value of the score, distance is a Euclidean distance of a K-nearest neighbor of the K-nearest neighbors to the mapped embedded user-generated query, min_distance is a minimum distance a Euclidean distance between the embedded user-generated query in the vector space and a closest data point in the vector space as determined by a nearest neighbor search, WD is a distance coefficient, count is the count, mean_count is a sum of all counts of all documents in the secondary list of documents divided by a sum of documents in the secondary list of documents, and WC is a count coefficient.

15. The computing system of claim 14, wherein WD is in a range of 1.0 to 2.0.

16. The computing system of claim 14, wherein WC is in a range of 0.5 to 1.0.

17. The computing system of claim 13, wherein the embeddings are generated with sentence transformers.

* * * * *